(12) United States Patent
Ueno et al.

(10) Patent No.: US 11,715,018 B2
(45) Date of Patent: Aug. 1, 2023

(54) IMAGE PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Kunikazu Ueno, Kanagawa (JP); Shintaro Adachi, Kanagawa (JP); Akinobu Yamaguchi, Kanagawa (JP); Shunichi Kimura, Kanagawa (JP); Yang Liu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 317 days.

(21) Appl. No.: 16/722,105

(22) Filed: Dec. 20, 2019

(65) Prior Publication Data

US 2020/0311883 A1  Oct. 1, 2020

(30) Foreign Application Priority Data

Apr. 1, 2019  (JP) ................................ 2019-070098

(51) Int. Cl.
*G06N 3/088* (2023.01)
*G06T 5/00* (2006.01)
(Continued)

(52) U.S. Cl.
CPC ............ *G06N 3/088* (2013.01); *G06N 3/045* (2023.01); *G06T 5/005* (2013.01); *G06V 10/273* (2022.01);
(Continued)

(58) Field of Classification Search
CPC combination set(s) only.
See application file for complete search history.

(56) References Cited

U.S. PATENT DOCUMENTS 5,631,984 A * 5/1997 Graf ..................... H04N 1/4115
382/317
5,861,355 A * 1/1999 Olson ....................... B41L 1/36
503/201
(Continued)

FOREIGN PATENT DOCUMENTS

JP      H06-060222 A    3/1994
JP      H07-200720 A    8/1995
(Continued)

OTHER PUBLICATIONS

Vishwanath et al., "Deep Reader: Information extraction from Document images via relation extraction and Natural Language", Dec. 14, 2018, arXiv (Year: 2018).*
(Continued)

*Primary Examiner* — Zhiyu Lu
(74) *Attorney, Agent, or Firm* — Oliff PLC

(57) ABSTRACT

An image processing apparatus includes a first image generator and a second image generator. The first image generator generates a first image, including a predetermined ruled-line image and an inscription image, from a second sheet in a sheet group. The sheet group is obtained by stacking multiple sheets including a single first sheet and the second sheet. The first sheet has inscription information inscribed thereon. The second sheet has the inscription image corresponding to the inscription information transferred thereon and includes the ruled-line image. The second image generator generates a second image in which a surplus image is removed from the first image generated by the first image generator in accordance with a learning model that has learned to remove the surplus image different from the ruled-line image and the inscription image.

20 Claims, 13 Drawing Sheets

(51) Int. Cl.
  *G06V 30/32* (2022.01)
  *G06V 30/412* (2022.01)
  *G06N 3/045* (2023.01)
  *G06V 10/82* (2022.01)
  *G06V 10/26* (2022.01)

(52) U.S. Cl.
  CPC .............. *G06V 10/82* (2022.01); *G06V 30/32* (2022.01); *G06V 30/412* (2022.01); *G06T 2207/10008* (2013.01); *G06T 2207/30176* (2013.01)

(56) References Cited

U.S. PATENT DOCUMENTS

| | | | | |
|---|---|---|---|---|
| 5,863,629 | A * | 1/1999 | Kuo | B41L 1/36 428/40.1 |
| 5,944,351 | A * | 8/1999 | Koploy | B42D 5/021 281/21.1 |
| 6,332,032 | B1 * | 12/2001 | Michael | G06T 7/0004 382/113 |
| 6,850,645 | B2 * | 2/2005 | Naoi | G06V 30/242 382/176 |
| 8,824,785 | B2 * | 9/2014 | Ives | G06V 30/412 382/175 |
| 9,336,437 | B2 * | 5/2016 | Ives | G06V 30/412 |
| 9,361,536 | B1 * | 6/2016 | Howe | H04N 1/00331 |
| 2003/0130992 | A1 * | 7/2003 | Tyan | G06V 10/22 707/E17.022 |
| 2007/0025627 | A1 * | 2/2007 | Hasegawa | H04N 1/41 382/239 |
| 2008/0175483 | A1 * | 7/2008 | Suwa | G06V 30/155 382/190 |
| 2008/0292191 | A1 * | 11/2008 | Okita | H04N 1/387 382/187 |
| 2010/0033741 | A1 * | 2/2010 | Kido | H04N 1/3871 358/1.9 |
| 2011/0182508 | A1 * | 7/2011 | Ives | G06V 30/412 382/164 |
| 2013/0238966 | A1 * | 9/2013 | Barrus | G06V 30/412 715/223 |
| 2014/0348422 | A1 * | 11/2014 | Ives | G06V 30/40 382/164 |
| 2017/0270359 | A1 * | 9/2017 | Ouchi | H04N 1/58 |
| 2018/0211106 | A1 * | 7/2018 | Kamada | G06V 30/413 |

FOREIGN PATENT DOCUMENTS

| | | |
|---|---|---|
| JP | 2000-172780 A | 6/2000 |
| JP | 2003-030644 A | 1/2003 |

OTHER PUBLICATIONS

Phillip Isola et al.; "Image-to-Image Translation with Conditional Adversarial Networks;" Berkeley AI Research Laboratory; Nov. 26, 2018; p. 9-25.

Dec. 20, 2022 Office Action issued in Japanese Patent Application No. 2019-070098.

* cited by examiner

FIG. 5

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-070098 filed Apr. 1, 2019.

BACKGROUND

(i) Technical Field

The present disclosure relates to image processing apparatuses and non-transitory computer readable media.

(ii) Related Art

A known image processing apparatus in the related art recognizes information formed on a form from a form image, such as text inscribed on a form from a form image. A form preliminarily has ruled-line frames and ruled lines in accordance with the inscribed contents, and these ruled-line frames and ruled lines interfere with the text recognition process. As a technology that takes into account ruled-line frames and ruled lines, for example, Japanese Unexamined Patent Application Publication No. 2000-172780 discloses a form registration apparatus. Specifically, when the format of a form is to be converted into data and is to be registered, this form registration apparatus removes the ruled-line frames and ruled lines from the read image of the form after recognizing the ruled-line frames and ruled lines, and recognizes preliminarily-printed text from the image from which the ruled-line frames and ruled lines have been removed.

In order to form text inscribed by a user onto multiple sheets of a form, a transfer member, such as a carbon sheet, is sometimes interposed between the multiple sheets, so that text inscribed on the uppermost sheet is transferred onto a lower sheet. However, sheet or sheets located below the transfer member, such as a carbon sheet, may sometimes have superposed thereon information other than the text inscribed by the user, such as an undesired imprint, including a scratch mark or an abrasion mark. An undesired imprint, such as a scratch mark or an abrasion mark, becomes a hindrance when obtaining text information by recognizing text from an image obtained as a result of scanning a sheet. Therefore, there is room for improvement for recognizing text from an image with an undesired imprint superposed thereon, such as information other than the text inscribed by the user.

SUMMARY

Aspects of non-limiting embodiments of the present disclosure relate to an image processing apparatus and a non-transitory computer readable medium that may extract an inscription image corresponding to inscription information inscribed by a user even when an image includes a surplus image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a first image generator and a second image generator. The first image generator generates a first image, including a predetermined ruled-line image and an inscription image, from a second sheet in a sheet group. The sheet group is obtained by stacking multiple sheets including a single first sheet and the second sheet. The first sheet has inscription information inscribed thereon. The second sheet has the inscription image corresponding to the inscription information transferred thereon and includes the ruled-line image. The second image generator generates a second image in which a surplus image is removed from the first image generated by the first image generator in accordance with a learning model that has learned to remove the surplus image different from the ruled-line image and the inscription image.

BRIEF DESCRIPTION OF THE DRAWINGS

Exemplary embodiments of the present disclosure will be described in detail based on the following figures, wherein:

FIG. 5 is an image diagram illustrating an example of a slip image;

DETAILED DESCRIPTION

Exemplary embodiments of the present disclosure will be described in detail below with reference to the drawings. Components and processes having the same effects and functions will be given the same reference signs throughout the drawings, and redundant descriptions may be omitted, where appropriate.

First Exemplary Embodiment

Figure 1:
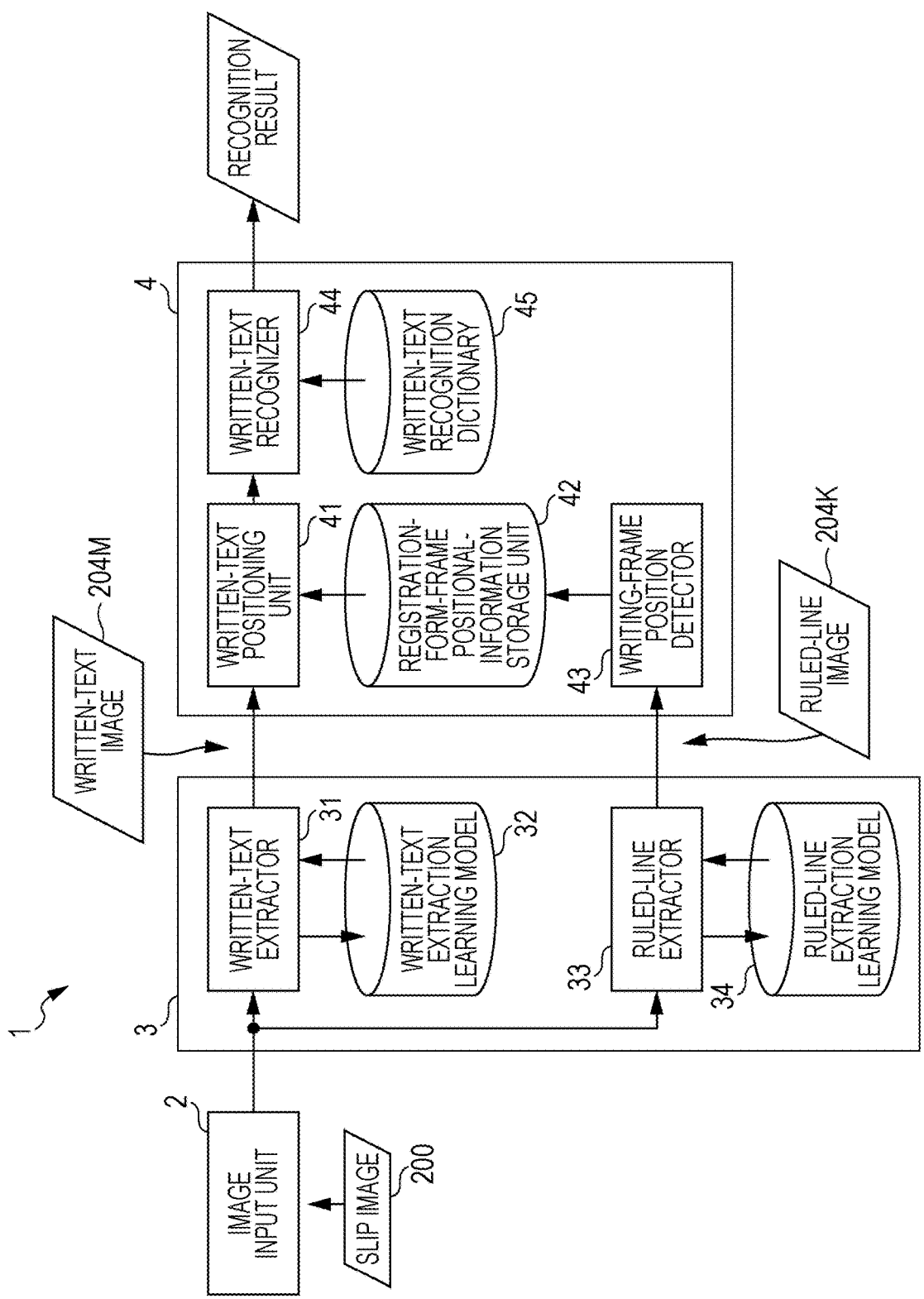
FIG. 1 is a block diagram illustrating a functional configuration of an image processing apparatus according to a first exemplary embodiment.

FIG. 1 illustrates an example of the configuration of an image processing apparatus 1 according to a first exemplary embodiment of the present disclosure.

In this exemplary embodiment, the disclosed technology is applied to image processing for recognizing text from an input image.

This exemplary embodiment relates to an example where text recognition is performed by using an image reader, such as a scanner, to read any one of multiple sheets including an upper sheet on which text or a mark is inscribed and a lower sheet onto which the text or mark is transferred by a transfer member (e.g., carbon). The multiple stacked sheets (sheet group) will be referred to as "form" hereinafter. Each of the sheets included in the form will be referred to as "slip" hereinafter. In particular, a sheet that someone writes onto may be referred to as an "original", and a sheet to which the writing is transferred to may be referred to as "copy".

The image processing apparatus 1 according to this exemplary embodiment outputs a text code by recognizing a text image, such as written text, included in a slip image obtained as a result of the image reader, such as a scanner, reading a slip.

Although this exemplary embodiment relates to a case where a sheet having undergone a transfer process by using a carbon sheet is used, the present disclosure is not limited to carbon copy. The present disclosure is also applicable to other copy technologies where the text or mark written on the original is transferred to a copy in darkness that reflects a level of pressure applied when the text or mark is written on the original.

Furthermore, the terms "transfer", "copy", and such are not intended to be limiting. For example, the line thickness of the text or mark on the original and that of the transferred text or mark on the copy may vary. When using the carbon copy technology, for example, the line thickness of the text or mark on the original depends on the line thickness of the writing tool itself, but the line thickness of the transferred text or mark on the copy depends on force, such as writing pressure.

A copy obtained by using methods such as carbon copy may have an undesired imprint, such as a stain, a scratch mark, or an abrasion mark, in addition to whatever written in the original. A slip image obtained as a result of the image reader, such as a scanner, reading the slip having the undesired imprint, such as a stain, a scratch mark, or an abrasion mark, is a deteriorated image, as compared with a slip image prior to having the undesired imprint, such as a stain, a scratch mark, or an abrasion mark. The deteriorated image having the undesired imprint, such as a stain, a scratch mark, or an abrasion mark, as noise may sometimes be non-recognizable by a standard recognizer due to image quality deterioration. The image processing apparatus 1 according to this exemplary embodiment has a function of performing text recognition by removing noise from such an image deteriorated due to an undesired imprint, such as a stain, a scratch mark, or an abrasion mark.

In this exemplary embodiment, it is conceivable that noise caused by an undesired imprint, such as a stain, a scratch mark, or an abrasion mark, which is a cause of a deteriorated image, is an image (surplus image) different from preliminarily-formed ruled lines and from text and a mark (inscription information) inscribed by a user. This surplus image is formed by force acting on the transfer member, such as a carbon sheet, in a situation other than when the text and mark (inscription information) are inscribed by the user. Therefore, noise in this exemplary embodiment refers to an image different from the preliminarily-formed ruled lines and from the text and mark (inscription information) inscribed by the user. The term "ruled" is not intended to be limiting to straightness or use of a ruler. Lines that indicate regions for providing different pieces of information in a form, for example, are within the scope of "ruled lines". The inscription information is information inscribed by the user and also indicates an inscription image, such as a text image, corresponding to information such as text information.

For example, if a first sheet and a second sheet are stacked, the inscription information is formed both on the first sheet and the second sheet, whereas the surplus image may be regarded as being (an image according to) information formed on the second sheet and onward without being formed on the first sheet. In detail, the inscription information refers to information to be inscribed by the user, such as an address and a name. Thus, for example, in the case of stacked sheets, the inscription information exists on the uppermost sheet and is inscribed on the lower sheet or sheets through the transfer member. On the other hand, the surplus image caused by a scratch mark or an abrasion mark does not exist on the uppermost sheet since the scratch mark or the abrasion mark does not involve the use of a writing tool, such as a pen, but is inscribed on the lower sheet or sheets below the uppermost sheet through the transfer member. Specifically, the inscription information exists in every one of the stacked sheets, whereas the surplus image does not exist on the uppermost sheet of the stacked sheets but exists on the second sheet and onward located below the uppermost sheet. In other words, the surplus image remains as a trace according to a certain type of information but does not exist as a color image on the first sheet, and exists as a color image on the second sheet and onward.

For example, if the writing tool used for the inscription onto the form is, for example, a pen, the inscription information may be regarded as being information printed with the pen, whereas the surplus image may be regarded as being (an image according to) information about contents different from the information printed with the pen. In detail, since the inscription information is information, such as an address or a name, inscribed by using a writing tool or a printer, it may be regarded that the inscription information is inscribed with substantially uniform pressure. Therefore, the thickness and shape of the text as the inscription information are substantially uniform on a single slip. The same applies to a case where a printer is used. On the other hand, in the surplus image formed by a scratch mark or an abrasion mark, the pressure varies, and the corresponding thickness and shape also vary. A learning device, such as a neural network, is used for performing a learning process for determining whether or not the thickness and the shape are uniform, and for distinguishing the surplus image and the inscription information from each other. In another expression, the surplus image may also be regarded as being an image based on randomly-inscribed information.

Furthermore, for example, in view of ruled lines preliminarily formed on sheets, the surplus image may be regarded as being (an image according to) information formed astride the inscription information and the ruled lines. In detail, the surplus image formed by a scratch mark or an abrasion mark is different from the inscription information inscribed by the user in that the surplus image may sometimes exist astride another inscription information or already-existing ruled-line information. In other words, information overlapping or overlying the ruled-line information or the inscription information may be regarded as being a surplus image. Only information overlapping the ruled-line information or the inscription information may be regarded as being a surplus image. The thickness and shape of an inscribed image may be recognized from the overlapping surplus image, and an image with a thickness and shape resembling those of the image may be recognized as a surplus image. The image may be identified as a surplus image even if the image does not exist astride or overlap the ruled-line information or the inscription information.

Furthermore, since the inscription information is information inscribed by the user, a specific input image, such as a circular image or a check image, for identifying a product number or a correction line (cancellation line) for correcting a mistake in the address or name may also be regarded as being inscription information. Because the specific input image is also information inscribed on the first sheet of the stacked sheets of the form, and the thickness and shape inscribed by using a writing tool, such as a pen, are the same type of information, the specific input image may be distinguished as being inscription information.

In this exemplary embodiment, the surplus image is removed from an image (first image) including a ruled-line image and an inscription image, so that an image (second image) including the ruled-line image alone and the inscription image alone corresponding to the ruled-line image and the inscription information is generated. This inscription image may be regarded as being constituted of information including the image corresponding to the inscription information and the surplus image. Then, it may be regarded that the image (second image) including the ruled-line image alone and the inscription image alone corresponding to the ruled-line image and the inscription information is generated by removing the surplus image from the image (first image) including the ruled-line image and the inscription image including the surplus image.

As shown in FIG. 1, the image processing apparatus 1 includes an image input unit 2, a text-and-ruled-line extractor 3, and a text recognizer 4. The text-and-ruled-line extractor 3 includes a written-text extractor 31, a written-text extraction learning model 32, a ruled-line extractor 33, and a ruled-line extraction learning model 34. The text recognizer 4 includes a written-text positioning unit 41, a registration-form-frame positional-information storage unit 42, a writing-frame position detector 43, a written-text recognizer 44, and a written-text recognition dictionary 45.

The image input unit 2 receives at least one slip image and outputs the slip image to the text-and-ruled-line extractor 3. The text-and-ruled-line extractor 3 extracts written text and ruled lines by using the slip image from the image input unit 2 and outputs the written text and ruled lines, that is, extracts a written-text image and a ruled-line image as intermediate products from the slip image. The text recognizer 4 uses the intermediate products (i.e., the written-text image and the ruled-line image) generated in the text-and-ruled-line extractor 3 to recognize the written-text image formed in the slip, and outputs the recognition result.

In detail, the image input unit 2 receives the at least one slip image. For example, the image input unit 2 receives, as a slip image (e.g., a slip image shown in FIG. 5), a scanned image generated as a result of the image reader, such as a scanner, image-scanning each of multiple slips included in the form.

Figure 5:
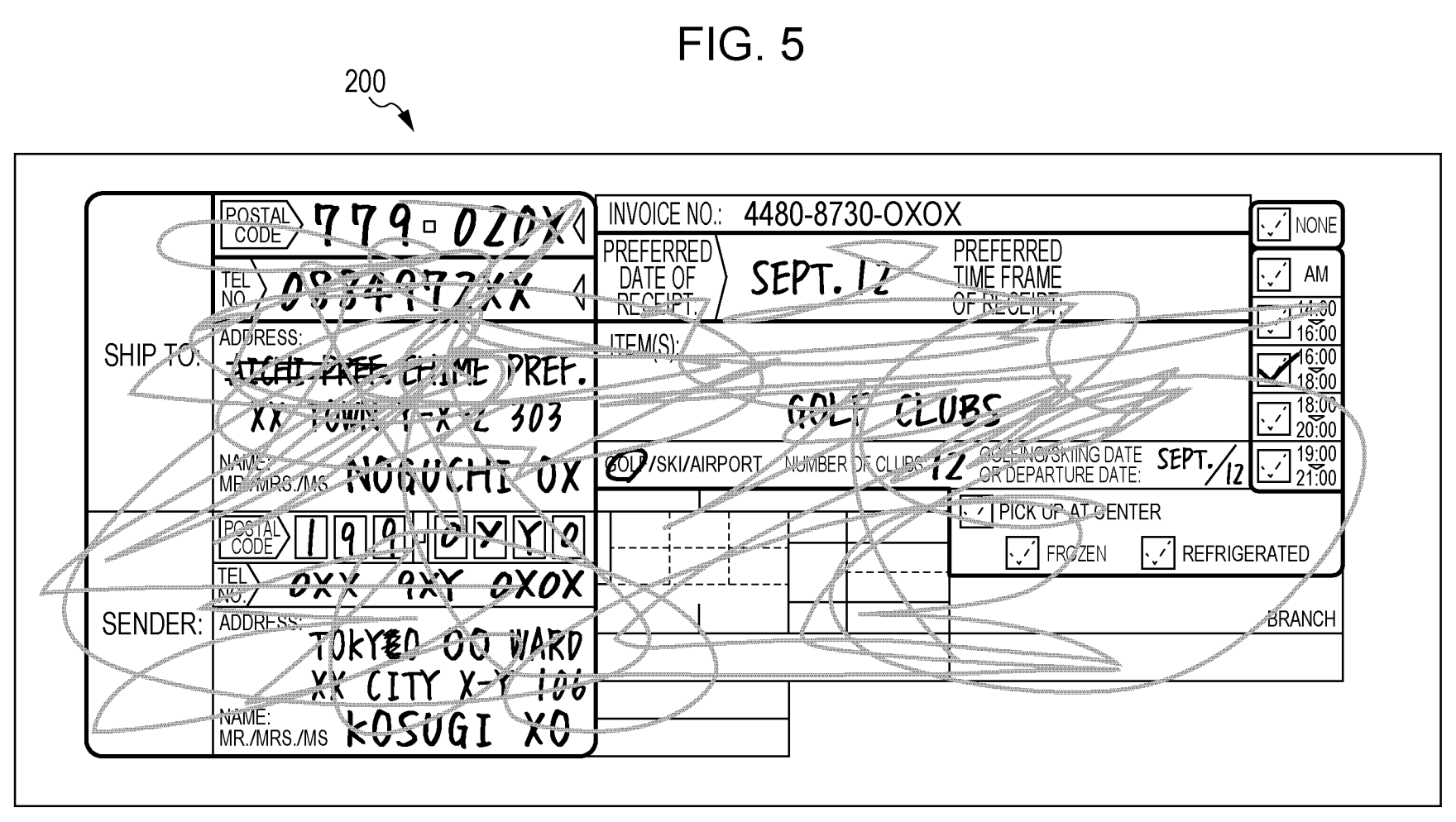

In the example shown in FIG. 5, a form to be used when sending an item is provided with multiple inscription fields where inscription information is inscribed by the user. In detail, fields where a postal code, a telephone number, an address, and a name are inscribed are provided as each of information about the shipping destination and information about the sender, and fields where a desired date of receipt and a desired time frame of receipt are inscribed as information related to the receipt of the item and fields where information indicating the content of the item is inscribed are provided.

The text-and-ruled-line extractor 3 uses the slip image from the image input unit 2 to extract the written text and the ruled lines. In detail, the written-text extractor 31 uses the written-text extraction learning model 32 to extract the written-text image from the slip image and outputs the extracted written-text image as an intermediate product (e.g., an image shown in FIG. 6). Furthermore, the ruled-line extractor 33 uses the ruled-line extraction learning model 34 to extract the ruled-line image from the slip image and outputs the extracted ruled-line image as an intermediate product (e.g., an image shown in FIG. 7).

The written-text image extracted by the written-text extractor 31 is an intermediate product generated (or estimated) from the slip image. The ruled-line image extracted by the ruled-line extractor 33 is also an intermediate product generated (or estimated) from the slip image. In other words, the text-and-ruled-line extractor 3 generates (or estimates) a written-text image and a ruled-line image in a slip image that does not include noise caused by an undesired imprint, such as a scratch mark or an abrasion mark.

Next, the text-and-ruled-line extractor 3 will be described in detail.

In the text-and-ruled-line extractor 3, the written-text extraction learning model 32 is a learning model that has already undergone a learning process, for generating an inscription image corresponding to inscription information including written text formed on a slip, from a slip image (i.e., an image obtained by reading a copy included in multiple sheets constituting a form). The written-text extraction learning model 32 is, for example, a model that defines a learned neural network and is expressed as, for example, a group of information about the weight (strength) of bonding between nodes (neurons) constituting the neural network.

Figure 2:
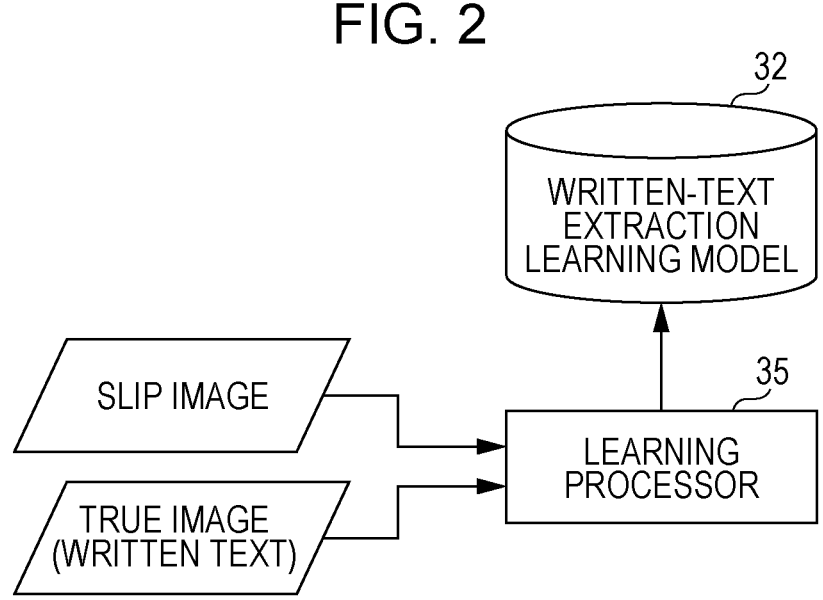
FIG. 2 illustrates a learning process for learning a written-text extraction learning model.

The written-text extraction learning model 32 is generated in accordance with a learning process performed by a learning processor 35 (see FIG. 2). The learning processor 35 performs the learning process by using a large number of pairs of input images indicating inscription information deteriorated due to noise caused by an undesired imprint, such as a scratch mark and an abrasion mark, and true images indicating non-deteriorated inscription information corresponding to the input images. The learning process performed by the learning processor 35 will be described later.

As an alternative to this exemplary embodiment in which the learning process is performed by using an input image indicating inscription information deteriorated due to noise caused by an undesired imprint and a true image, a deteriorated image may be learned by including therein an image deteriorated due to a stain and skewness.

The ruled-line extraction learning model 34 is a learning model that has already undergone a learning process for generating a ruled-line image, which indicates ruled lines formed on a slip, from a slip image. The ruled-line extraction learning model 34 is, for example, a model that defines a learned neural network and is expressed as, for example, a group of information about the weight (strength) of bonding between nodes (neurons) constituting the neural network.

Figure 3:
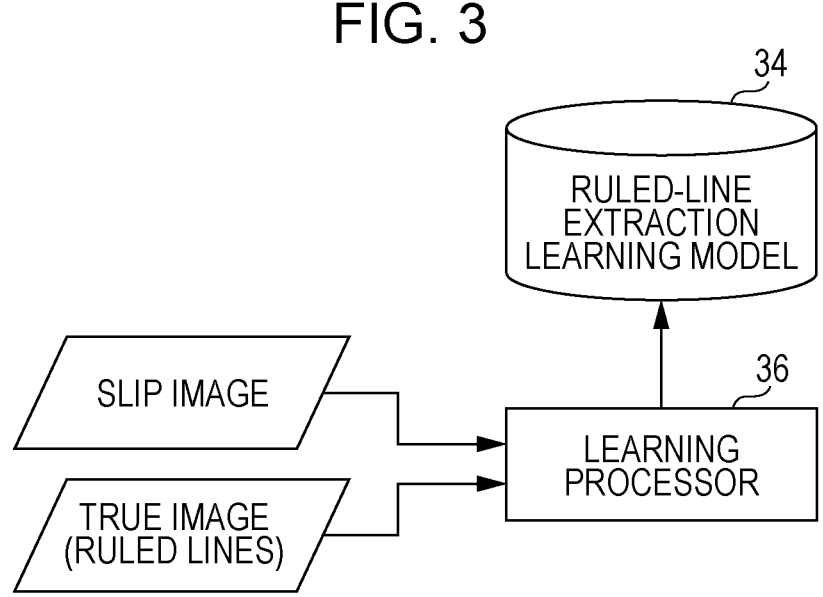
FIG. 3 illustrates a learning process for learning a ruled-line extraction learning model.

The ruled-line extraction learning model 34 is generated in accordance with a learning process performed by a learning processor 36 (see FIG. 3). The learning processor 36 performs the learning process by using a large number of pairs of input images including ruled lines deteriorated due to noise and true images indicating ruled-line images corresponding to the input images. The learning process performed by the learning processor 36 will be described later.

Next, the learning processors 35 and 36 will be described with reference to FIG. 4. The learning processor 35 includes a generator 350 and a discriminator 352 that constitute a generative adversarial network (GAN).

Figure 6:
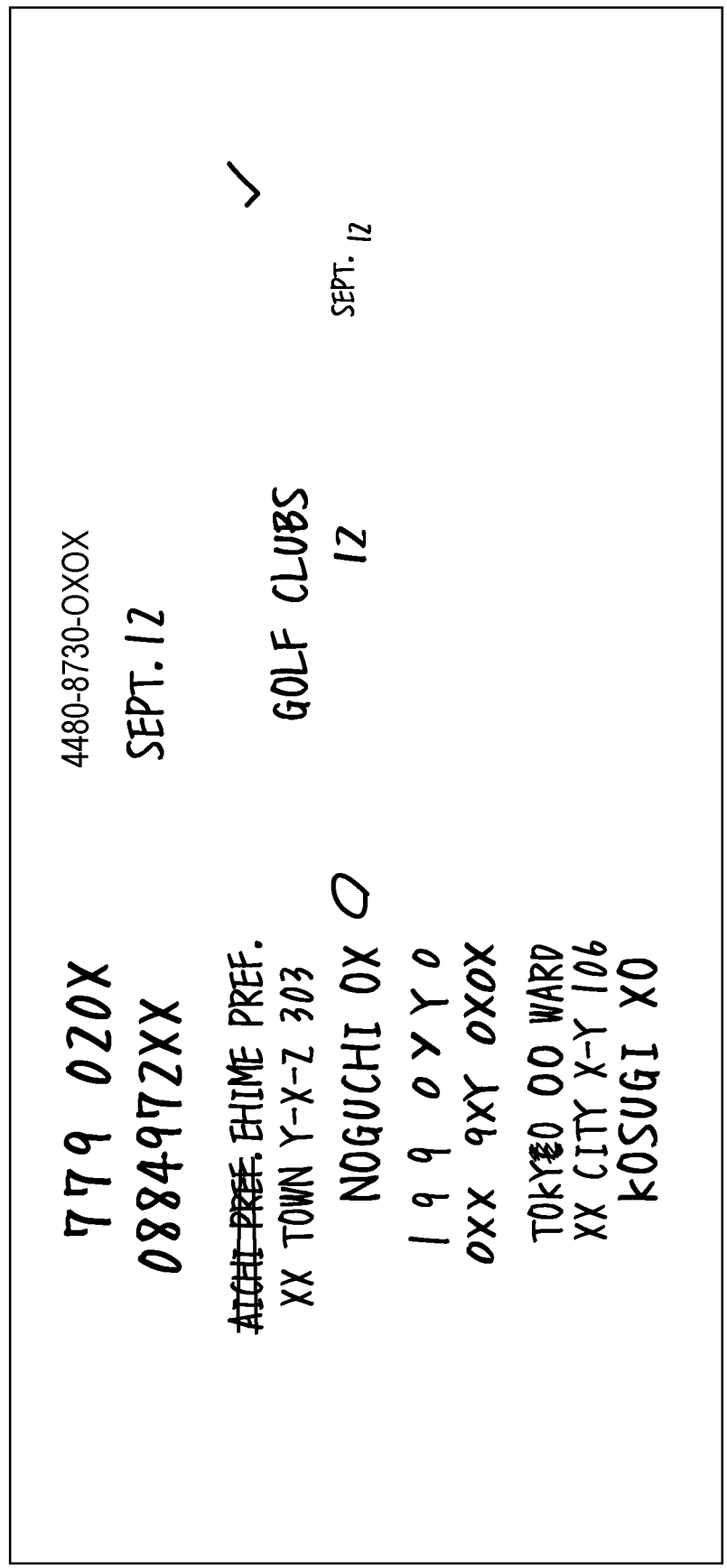
FIG. 6 is an image diagram illustrating an example of a written-text image.

The learning processor 35 retains a large number of pairs of input images 200 and true images 202 as learning data. As shown in FIG. 5, an input image 200 is a slip image that contains noise caused by an undesired imprint, such as a scratch mark or an abrasion mark. In the input image 200 shown in FIG. 5, noise caused by an undesired imprint, such as a scratch mark or an abrasion mark, appears in the slip image. Noise caused by an undesired imprint, such as a scratch mark or an abrasion mark, interferes with a process for recognizing text from an image. In contrast, a true image 202 shown in FIG. 6 is an image of written text alone. Text is recognizable from the true image 202.

Figure 4:
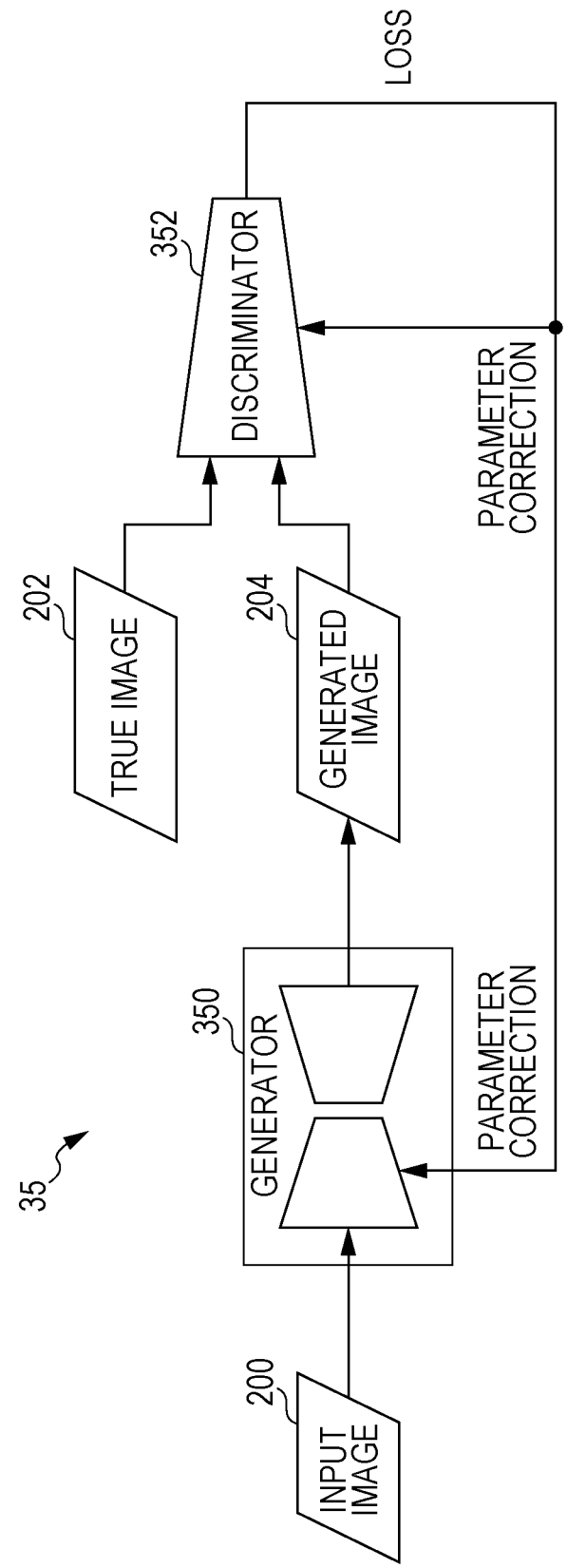
FIG. 4 is a block diagram illustrating an example where a learning processor is configured as a generative adversarial network (GAN)

The generator 350 shown in FIG. 4 is a neural network that generates a generated image 204 from the input image 200. The generated image 204 is an estimated image of the true image 202 corresponding to the input image 200. Specifically, the generator 350 generates the generated image 204 similar to the true image 202 from the input image 200 containing noise caused by an undesired imprint, such as a scratch mark or an abrasion mark. The generator 350 performs the learning process by using a large number of input images 200, so as to generate the generated image 204 that is more similar to the true image 202.

The discriminator 352 is a neural network that discriminates whether an input image is either one of the true image 202 corresponding to the input image 200 and the generated image 204 generated by the generator 350 from the input image 200. The learning processor 35 inputs the true image 202 (and the input image 200 corresponding thereto) or the generated image 204 (and the input image 200 corresponding thereto) to the discriminator 352. Accordingly, the discriminator 352 discriminates whether the input image is the true image 202 (true) or the generated image 204 (false), and outputs a signal indicating the discrimination result.

The learning processor 35 compares the result indicating whether the image input to the discriminator 352 is true or false with the output signal from the discriminator 352, and feeds back a loss signal based on the comparison result to the weight parameters of the bonding between the nodes of the respective neural networks of the generator 350 and the discriminator 352. Accordingly, the generator 350 and the discriminator 352 perform the learning process.

The generator 350 and the discriminator 352 constituting the GAN proceeds with the learning process while working and improving with each other such that the former tries to generate a false image (i.e., the generated image 204) that is similar to teacher data (i.e., the true image 202) as much as possible, whereas the latter tries to properly discriminate the false image.

For example, the learning processor 35 may use a method similar to an algorithm called "pix2pix" (see "Image-to-Image Translation with Conditional Adversarial Networks", Phillip Isola et al., Berkeley AI Research (BAIR) Laboratory, UC Berkeley). In this case, for the learning process of the generator 350, a difference between the true image 202 and the generated image 204 is also fed back, in addition to the loss signal of the discriminator 352.

As another example, a GAN called Cycle GAN may be used in the learning processor 35. If Cycle GAN is used, the learning process is possible even if true images are not prepared for all input images.

In the image processing apparatus 1 according to this exemplary embodiment, the generator 350 having undergone a learning process and generated in accordance with the above-described technique is used as the learned written-text extraction learning model 32. The written-text extractor 31 generates (or estimates) an image indicating written text from a slip image by using this learned written-text extraction learning model 32, so as to extract a written-text image.

By using a sufficiently-learned written-text extraction learning model 32, it is not impossible to extract a recognizable written-text image from a slip image containing noise caused by an undesired imprint, such as a scratch mark or an abrasion mark.

Figure 7:
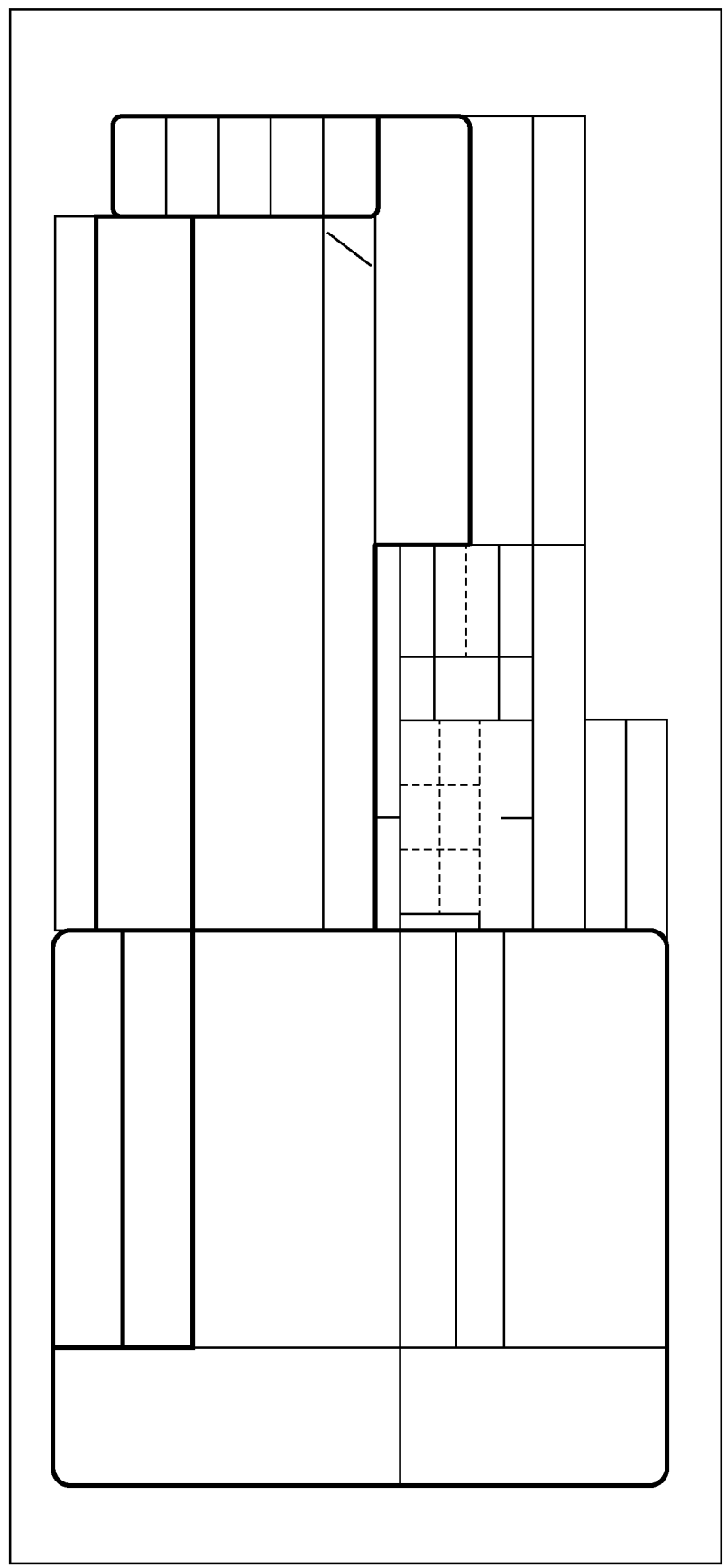
FIG. 7 is an image diagram illustrating an example of a ruled-line image.

Next, the learning processor 36 will be described. The learning processor 36 includes a generator 350 and a discriminator 352 that constitute a GAN (see FIG. 4). Because the learning processor 36 is similar to the learning processor 35 described above, a detailed description will be omitted. The learning processor 36 is different from the learning processor 35 in that it uses a ruled-line-only image, as shown in FIG. 7, as a true image 202.

In the image processing apparatus 1 according to this exemplary embodiment, the generator 350 having undergone a learning process is used as a learned ruled-line extraction learning model 34. The ruled-line extractor 33 generates (or estimates) an image indicating ruled lines from a slip image by using this learned ruled-line extraction learning model 34, so as to extract a ruled-line image.

By using a sufficiently-learned written-text extraction learning model 32, it is not impossible to extract a ruled-line image from a slip image containing noise caused by an undesired imprint, such as a scratch mark or an abrasion mark.

Next, the text recognizer 4 will be described.

The text recognizer 4 recognizes written text formed on a slip and outputs a recognition result. In detail, the written-text positioning unit 41 positions a written-text image by using registration-form-frame positional information stored in the registration-form-frame positional-information storage unit 42. The registration-form-frame positional-information storage unit 42 stores therein ruled-line-related information, such as the position, shape, and size of a writing frame in a ruled-line image detected by the writing-frame position detector 43, as the registration-form-frame positional information. The writing-frame position detector 43 detects, as an inscription region, an in-frame region in the ruled-line image extracted by the ruled-line extractor 33 and detects a frame of the inscription region as a writing frame. Therefore, the written-text positioning unit 41 positions the written-text image in correspondence with the writing frame by using the registration-form-frame positional information.

In detail, in the positioning process of the written-text image performed in the written-text positioning unit 41, the writing-frame position detector 43 detects the position, shape, and size of the frame image formed with multiple ruled-line images by using the ruled-line image extracted by the ruled-line extractor 33. The in-frame region indicated by this frame image corresponds to an inscription region in which inscription information is inscribed by the user. The writing-frame position detector 43 stores, in the registration-form-frame positional-information storage unit 42, writing-frame positional information indicating the writing frame according to the position, shape, and size of the frame image indicating this inscription region. In the registration-form-frame positional-information storage unit 42, information indicating the ruled lines formed in the form, that is, ruled-line-frame positional information indicating a ruled-line frame according to the position, shape, and size of a ruled-line-frame image, is preliminarily registered as the registration-form-frame positional information.

The written-text positioning unit 41 positions the written-text image by using the writing-frame positional information and the registration-form-frame positional information stored in the registration-form-frame positional-information storage unit 42. In detail, a difference is calculated by comparing the registered registration-form-frame positional information with the detected writing-frame positional information, thereby calculating an amount of positional displacement. The written-text positioning unit 41 performs a correcting process by moving either one of a written-text image 204M and a ruled-line image 204K by the calculated amount of positional displacement, so that the written-text image is positioned within the ruled-line frame.

Figure 8:
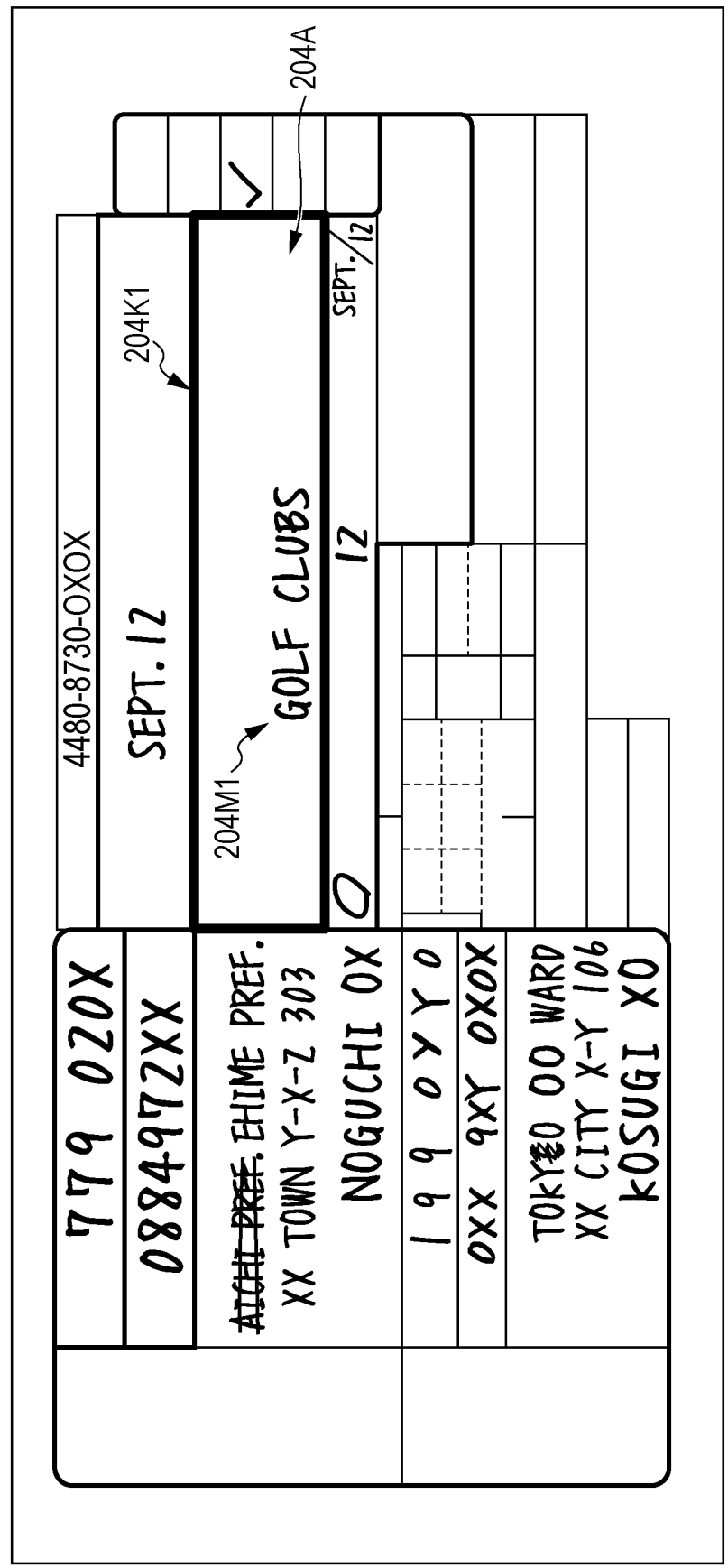
FIG. 8 is an image diagram illustrating an example of an image obtained by combining the written-text image and the ruled-line image.

For example, as shown in FIG. 8, when a written-text image extracted by the ruled-line extractor 33 is superposed onto a written-text image extracted by the written-text extractor 31 from the slip image 200, a text image is disposed within the ruled-line frame. The written-text positioning unit 41 associates the writing frame detected by the ruled-line extractor 33 with the written-text image extracted by the written-text extractor 31. In the superposed image of the extracted written-text images, a written-text image 204M1 is located in a region 204A within a ruled-line frame 204K1 indicating the content of an item.

The written-text recognizer 44 uses the written-text recognition dictionary 45 to recognize the written-text image from the superposed image obtained by the written-text positioning unit 41. The written-text recognition dictionary 45 has stored therein a database indicating a correspondence relationship between written-text images and text codes of plain text corresponding to the written-text images. Specifically, the text recognizer 4 generates a text code corresponding to inscription information from a written-text image generated as a result of the text-and-ruled-line extractor 3 removing (or suppressing) noise therefrom.

Figure 9:
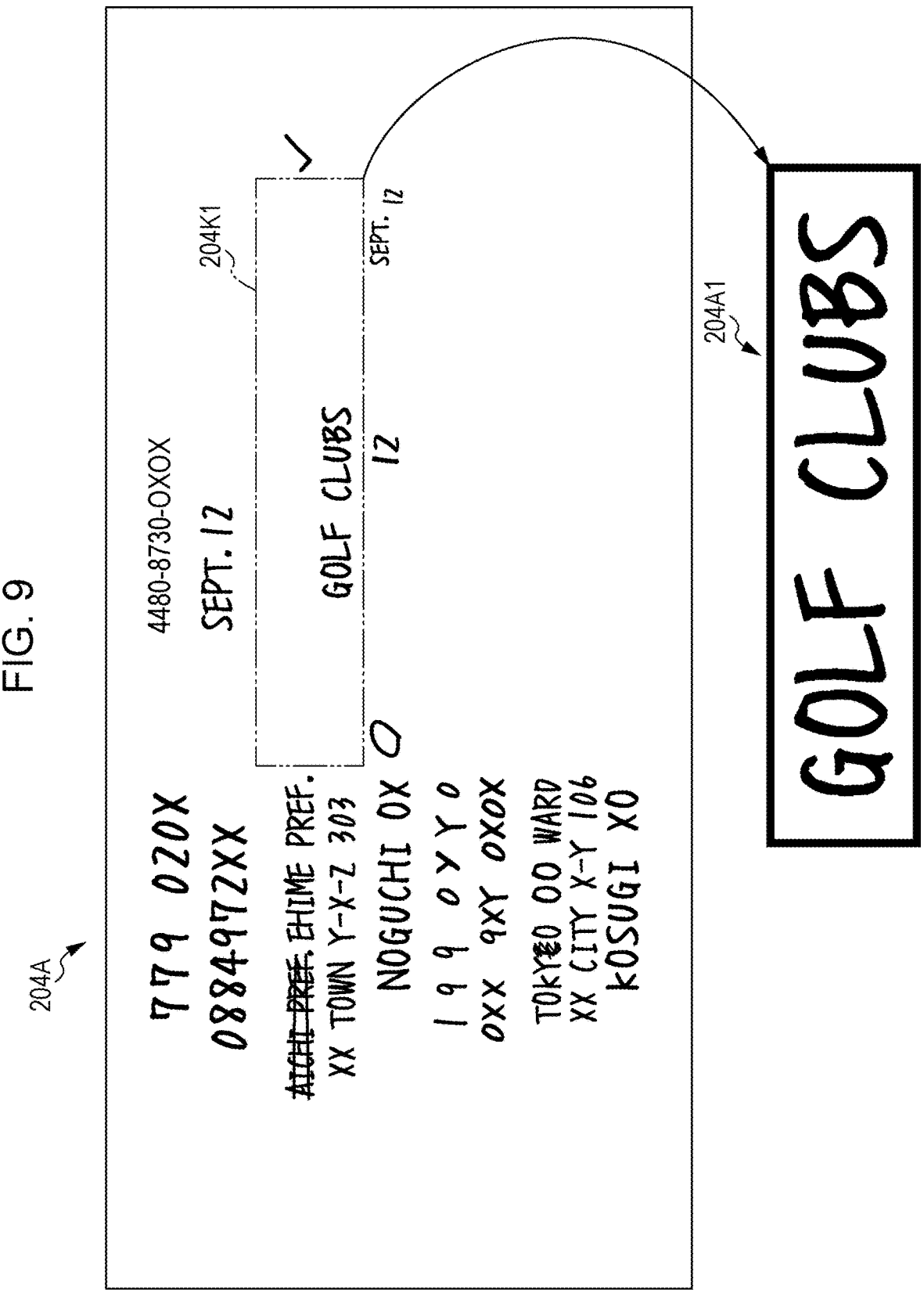
FIG. 9 is a diagram related to recognition of a region within a ruled-line frame in the written-text image.

In this process for recognizing a written-text image, the written-text recognizer 44 recognizes a text image for each region within the ruled-line frame positioned by the written-text positioning unit 41. In detail, for example, as shown in FIG. 9, the written-text recognizer 44 recognizes a partial written-text image 204A1 within the ruled-line frame 204K1 in the region 204A by using the written-text recognition dictionary 45. In the example shown in FIG. 9, a text code indicating "GOLF CLUBS" is generated as a recognition result.

In the slip image 200, multiple inscription fields where inscription information is inscribed by the user are provided in correspondence with the ruled-line frame. Each inscription field is set for each article of inscription information to be inscribed by the user. Therefore, the recognition result of the written-text image in each region of the ruled-line frame corresponds with each article of inscription information.

By associating information indicating each article of inscription information with each region of the ruled-line frame in the writing-frame positional information or the registration-form-frame positional information, the written-text recognizer 44 becomes capable of associating the recognition result with the information indicating each article of inscription information. In the example shown in FIG. 9, article information indicating the content of an item is added as attribute information to the text code indicating "GOLF CLUBS" as a recognition result. Accordingly, the article indicated by the text of the recognition result is identifiable.

The image input unit 2 is an example of a first image generator according to an exemplary embodiment of the present disclosure. The written-text extractor 31 and the text-and-ruled-line extractor 3 are an example of a second image generator according to an exemplary embodiment of the present disclosure. The text recognizer 4 is an example of an output unit according to an exemplary embodiment of the present disclosure.

For example, the image processing apparatus 1 described above is realizable by causing a computer to execute a program that expresses the above-described functions.

Figure 10:
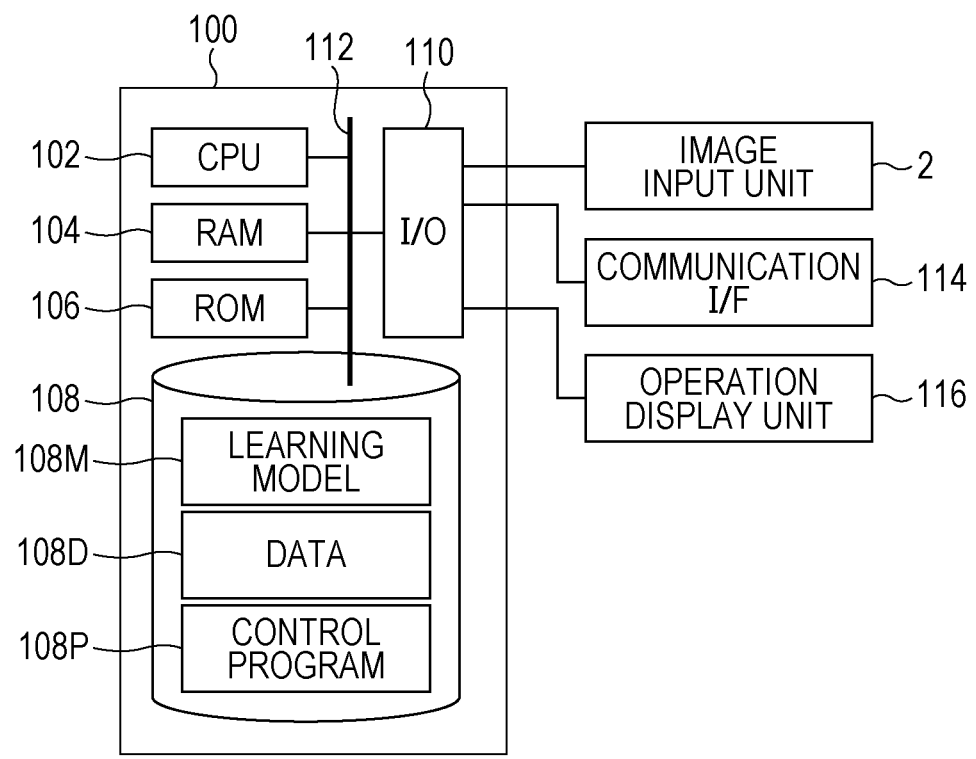
FIG. 10 is a block diagram illustrating an example where the image processing apparatus includes a computer.

FIG. 10 illustrates an example where a computer is included as an apparatus that executes a process for realizing various functions of the image processing apparatus 1.

A computer that functions as the image processing apparatus 1 shown in FIG. 10 includes a computer unit 100. The computer unit 100 includes a central processing unit (CPU) 102, a random access memory (RAM) 104, such as a volatile memory, a read-only memory (ROM) 106, an auxiliary storage device 108, such as a hard disk drive (HDD), and an input-output (I/O) interface 110. The CPU 102, the RAM 104, the ROM 106, the auxiliary storage device 108, and the I/O interface 110 are connected by a bus 112 so as to be capable of exchanging data and commands with one another. The I/O interface 110 is connected to the image input unit 2, a communication interface (I/F) 114, and an operation display unit 116, such as a display and a keyboard.

The auxiliary storage device 108 has a control program 108P stored therein for causing the computer unit 100 to function as the image processing apparatus 1 according to this exemplary embodiment. The CPU 102 reads the control program 108P from the auxiliary storage device 108 and develops the control program 108P in the RAM 104 to execute a process. Accordingly, the computer unit 100 executing the control program 108P operates as an information processing apparatus according to an exemplary embodiment of the present disclosure.

The auxiliary storage device 108 has stored therein a learning model 108M including the written-text extraction learning model 32 and the ruled-line extraction learning model 34, and data 108D including the registration-form-frame positional-information storage unit 42 and the written-text recognition dictionary 45. The control program 108P may be provided by a recording medium, such as a CD-ROM.

Next, image processing in the image processing apparatus 1 realized by the computer will be described.

Figure 11:
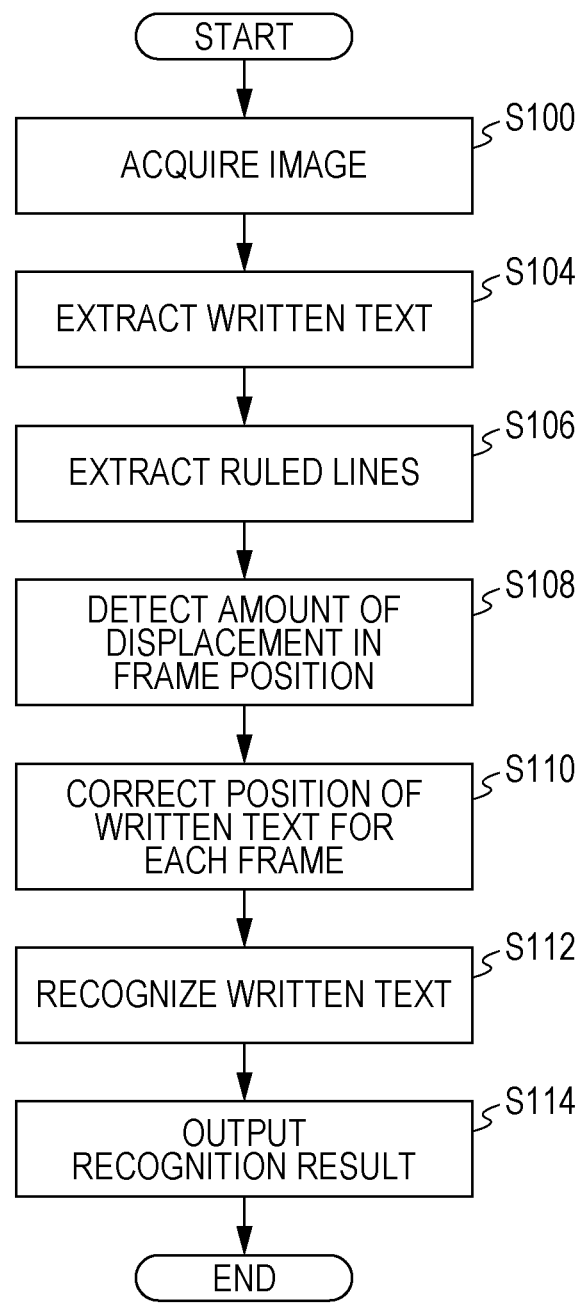
FIG. 11 is a flowchart illustrating an example of the flow of image processing according to the first exemplary embodiment.

FIG. 11 illustrates an example of the flow of image processing executed in accordance with the control program 108P in the computer unit 100.

The image processing shown in FIG. 11 is executed by the CPU 102 when the power of the computer unit 100 is turned on.

First, the CPU 102 acquires a slip image 200 from the image input unit 2 in step S100 and extracts a written-text image in step S104. Specifically, a written-text image 204M as an intermediate product is extracted from the slip image 200 by using the written-text extraction learning model 32.

In step S106, a ruled-line image is extracted. Specifically, a ruled-line image 204K as an intermediate product is extracted from the slip image 200 by using the ruled-line extraction learning model 34.

In step S108, an amount of positional displacement in a ruled-line frame in the slip image 200 is detected. In detail, the position, shape, and size of a frame image formed with multiple ruled-line images are detected by using the ruled-line image extracted in step S106. Then, writing-frame positional information indicating the writing frame according to the position, shape, and size of the frame image is stored in the data 108D in the auxiliary storage device 108. In the data 108D, information indicating the ruled lines formed in the form, that is, ruled-line-frame positional information indicating the ruled-line frame according to the position, shape, and size of the ruled-line-frame image, is preliminarily registered as registration-form-frame positional information.

In step S110, the position of written text is corrected for each ruled-line frame. In detail, the writing-frame positional information and the registration-form-frame positional information stored in the data 108D are compared with each other to calculate a difference, thereby calculating the amount of displacement in the frame position. Then, a correcting process is performed by moving either one of a written-text image 204M and a ruled-line image 204K by the calculated amount of displacement in the frame position, so that the written-text image is positioned within the ruled-line frame (see FIG. 8).

In step S112, the written-text image is recognized. In detail, the written-text image in each region of the ruled-line frame corrected in step S110 is recognized by using the written-text recognition dictionary 45. In step S114, the recognition result (e.g., a text code) in step S112 is output, and the routine of this process ends.

The image processing shown in FIG. 11 is an example of a process executed by the image processing apparatus 1 according to this exemplary embodiment.

Second Exemplary Embodiment

Next, a second exemplary embodiment will be described. In the second exemplary embodiment, the disclosed technology is applied to a case where image processing for recognizing text is executed after predetermined preprocessing has been performed on a slip image. Since components in the second exemplary embodiment are substantially similar to those in the first exemplary embodiment, identical components will be given the same reference signs, and detailed descriptions thereof will be omitted.

Figure 12:
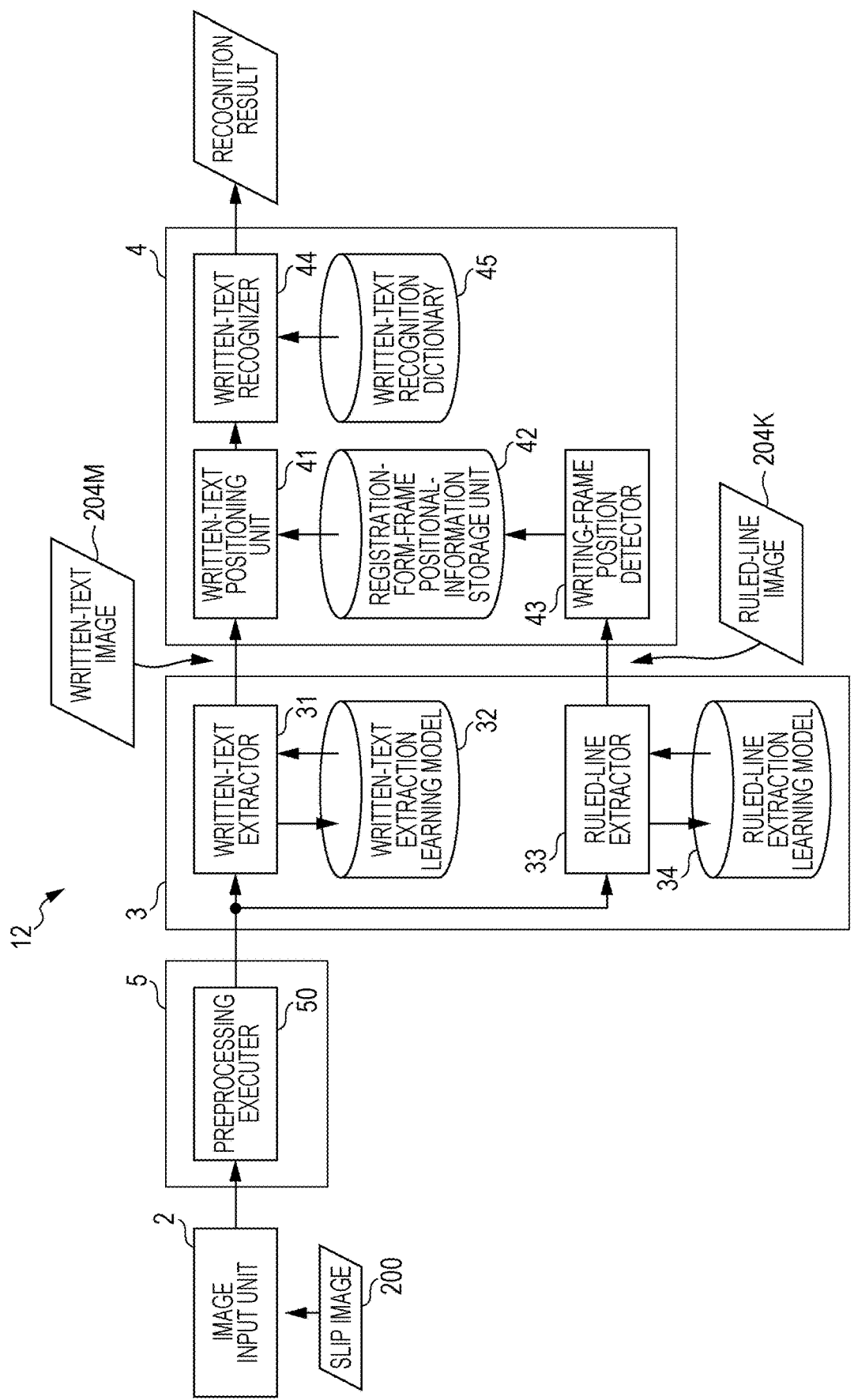
FIG. 12 is a block diagram illustrating a functional configuration of an image processing apparatus according to a second exemplary embodiment.

FIG. 12 illustrates an example of the configuration of an image processing apparatus 12 according to the second exemplary embodiment.

As shown in FIG. 12, the image processing apparatus 12 according to the second exemplary embodiment includes an image input unit 2, a preprocessor 5, a text-and-ruled-line extractor 3, and a text recognizer 4. The second exemplary embodiment is different from the first exemplary embodiment in that a slip image received by the image input unit 2 is output to the text-and-ruled-line extractor 3 after undergoing preprocessing by the preprocessor 5.

The preprocessor 5 includes a preprocessing executer 50. The preprocessing executer 50 included in the preprocessor 5 performs predetermined preprocessing on the slip image from the image input unit 2 and outputs the slip image. The preprocessing executer 50 performs simple image processing on the slip image. Examples of the simple image processing include color processing, gray-level correction, fixed noise processing, and sharpening.

An example of color processing includes removing the background color from the slip image. For example, a slip included in a form may sometimes have fixed text according to a blue background, assuming that inscription information, such as text or a figure, is to be inscribed with a writing tool using black ink. In this case, the preprocessing executer 50 preliminarily removes the text according to the blue background, so that fixed text different from the text inscribed by the user is preliminarily removable from the slip image to be input to the text-and-ruled-line extractor 3. Accordingly, the accuracy of the recognition result to be output may be improved.

An example of gray-level correction includes increasing the density of a written-text image. For example, an inscription image corresponding to inscription information inscribed by the user may be formed with a density lower than a preliminarily-assumed density due to a lack of writing pressure from the user or a lack of enough carbon on a carbon sheet. In this case, gray-level correction is performed for increasing the density of an inscription image, which is lower than a preliminarily-assumed density, by a predetermined density. As a result of this gray-level correction, the recognition rate of the text image, that is, the accuracy of the recognition result to be output, may be improved.

An example of fixed noise processing includes a simple noise removal process processable without using a preliminarily-learned learning model. A simple noise removal process involves, for example, removing noise (so-called salt-and-pepper noise) caused by scattering of dot images within predetermined pixels. By performing such a simple noise removal process, a simple noise image with low relation to the inscription information may be removed in advance from a slip image. Accordingly, the accuracy of the recognition result to be output may be improved.

An example of sharpening includes simple image processing for sharpening an image having a density gradient, as in a so-called blurry image. By performing such sharpening on a slip image, an inscription image in a slip image may be processed in advance to an image with an improvable recognition rate. Accordingly, the accuracy of the recognition result to be output may be improved.

Figure 13:
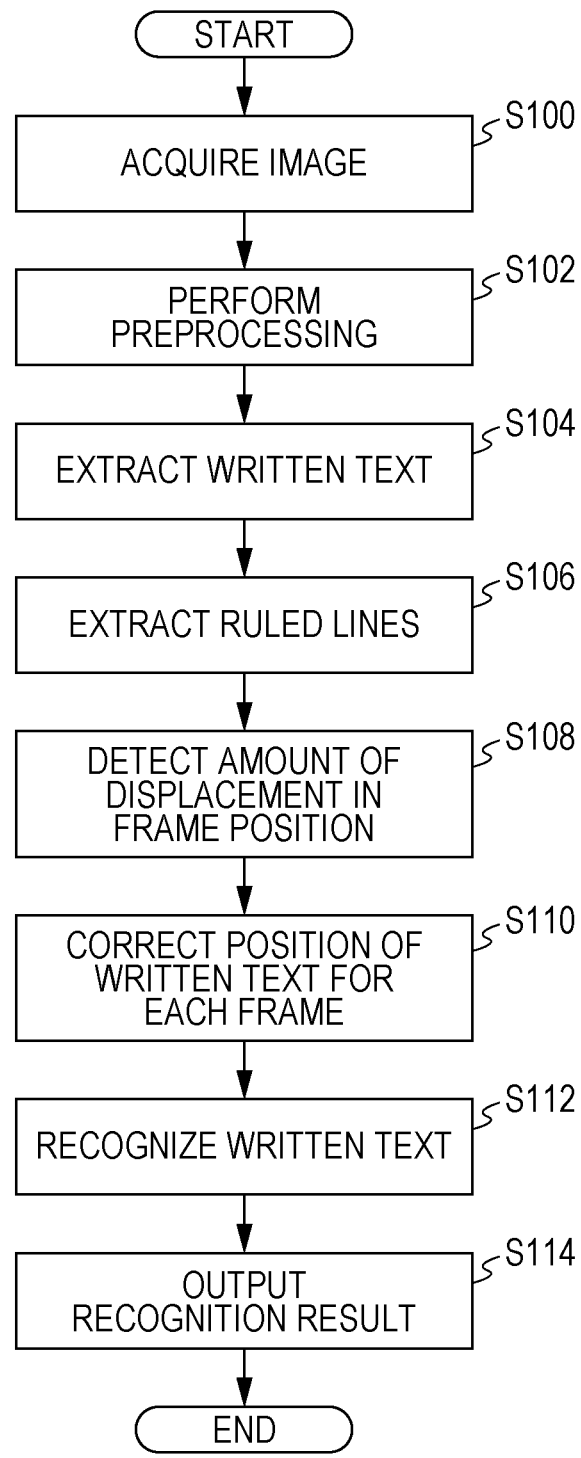
FIG. 13 is a flowchart illustrating an example of the flow of image processing according to the second exemplary embodiment.

FIG. 13 illustrates an example of the flow of image processing according to this exemplary embodiment.

The flow of image processing shown in FIG. 13 has an additional step S102 between step S100 and step S104 in the flow of image processing shown in FIG. 11. The CPU 102 performs the aforementioned preprocessing on the slip image 200 acquired from the image input unit 2 in step S102, and subsequently proceeds to step S104.

In this exemplary embodiment, image processing for recognizing text is executed after predetermined preprocessing is performed on a slip image. Therefore, it is desirable that the written-text extraction learning model 32 and the ruled-line extraction learning model 34 in the text-and-ruled-line extractor 3 perform a learning process by using the slip image that has undergone the predetermined preprocessing.

Third Exemplary Embodiment

Next, a third exemplary embodiment will be described. In the third exemplary embodiment, the disclosed technology is applied to a case where a process for correcting a recognition result of written text is executed. Since components in the third exemplary embodiment are substantially similar to those in the first exemplary embodiment, identical components will be given the same reference signs, and detailed descriptions thereof will be omitted.

Figure 14:
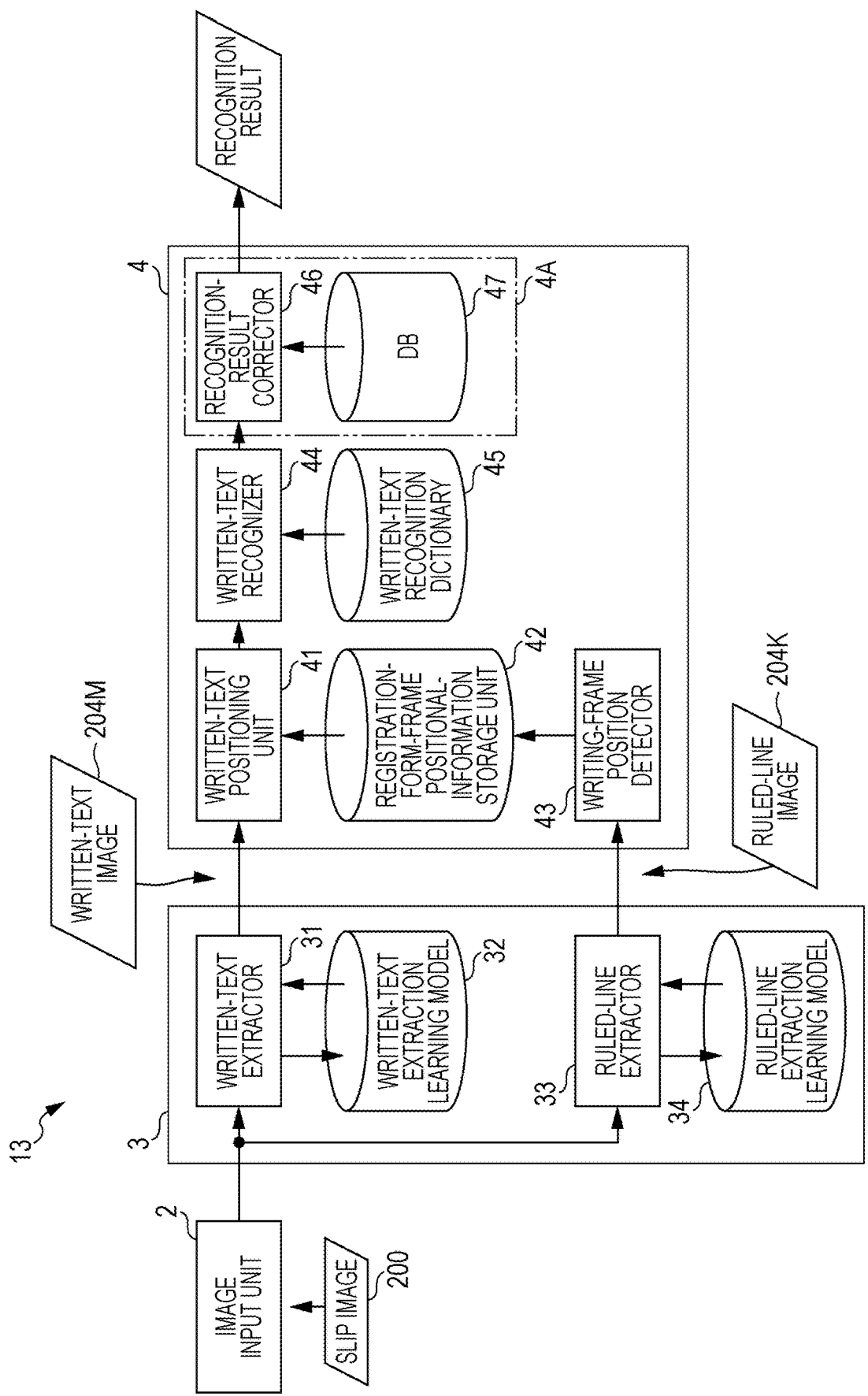
FIG. 14 is a block diagram illustrating a functional configuration of an image processing apparatus according to a third exemplary embodiment.

FIG. 14 illustrates an example of the configuration of an image processing apparatus 13 according to the third exemplary embodiment.

As shown in FIG. 14, the image processing apparatus 13 according to the third exemplary embodiment further includes a recognition corrector 4A in the text recognizer 4. The third exemplary embodiment is different from the first exemplary embodiment in that a recognition result obtained by the written-text recognizer 44 of the text recognizer 4 is corrected by the recognition corrector 4A, and that the corrected recognition result is output.

The recognition corrector 4A includes a recognition-result corrector 46 and a database (DB) 47. An example of the DB 47 includes an address DB. An address DB has prefecture names and municipality names registered therein. Another example of the DB 47 includes a postal code DB. A postal code DB is a database in which postal codes and the address DB are associated with each other. The recognition-result corrector 46 of the recognition corrector 4A uses the DB 47 to correct the recognition result obtained by the written-text recognizer 44 and outputs the corrected recognition result.

In detail, the recognition-result corrector 46 extracts the recognition result obtained by the written-text recognizer 44 and data resembling the recognition result from data registered in the DB 47. For example, if an address DB is registered as the DB 47, a text string that matches or resembles the text string of the address of the recognition result obtained by the written-text recognizer 44 is extracted. If the text string of the address of the recognition result obtained by the written-text recognizer 44 matches the text string extracted from the address DB, the recognition result obtained by the written-text recognizer 44 is output.

In contrast, if the text string of the address of the recognition result obtained by the written-text recognizer 44 does not match the text string extracted from the address DB, that is, if the text string of the recognition result obtained by the written-text recognizer 44 is not registered in the address DB, there is a high possibility that a falsely-recognized text string is included in the text string of the recognition result obtained by the written-text recognizer 44. Thus, the recognition-result corrector 46 compares the text string of the address of the recognition result with the text string extracted from the address DB and corrects the falsely-recognized text.

For example, a text string with a high matching rate with the text string of the address of the recognition result is extracted from the address DB and is replaced with the recognition result. With regard to this matching rate, the percentage of the number of matching characters between the text string of the address of the recognition result and the text string extracted from the address DB may be used. Multiple (e.g., three) text strings may be extracted from the address DB, starting from the highest matching rate, and one of the multiple (e.g., three) text strings may be selected. In this case, priority levels may be individually given to the multiple extracted (e.g., three) text strings. For example, the text string with the highest matching rate may be set automatically in accordance with the priority levels, or may be selected by the user.

If a postal code and an address are obtained as the recognition result, the recognition result may be corrected by using both the postal code and the address. For example, the address corresponding to the postal code in the recognition result is extracted from the postal code in the recognition result by using the postal code DB, and is compared with the address in the recognition result. The address in the recognition result is corrected based on the matching rate of the comparison result. Furthermore, the postal code corresponding to the address in the recognition result is extracted from the address in the recognition result by using the postal code DB, and is compared with the postal code in the recognition result. The postal code in the recognition result is corrected based on the matching rate of the comparison result. Alternatively, multiple candidates may be extracted by determining the matching rate based on a combination of the postal code and the address, and one of the extracted candidates may be selected.

Although the exemplary embodiments have been described above, the technical scope of the present disclosure is not limited to the scope defined in the above exemplary embodiments. Various modifications or alterations may be added to the above exemplary embodiments so long as they do not depart from the scope of the present disclosure, and exemplary embodiments obtained by adding such modifications or alterations thereto are included in the technical scope of the present disclosure.

As an alternative to each of the above exemplary embodiments in which an inspection process is realized by a software configuration based on a process using a flowchart, for example, each process may be realized by a hardware configuration.

Furthermore, a part of the image processing apparatus 1, for example, a neural network, such as a learning model, may be configured as a hardware circuit.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
  generate a first image, including a predetermined ruled-line image and an inscription image, from a second sheet in a sheet group, the sheet group being obtained by stacking a plurality of sheets including a first sheet and the second sheet, wherein
  the first sheet is an uppermost sheet of the plurality of sheets and inscription information is inscribed onto the first sheet by a user,
  the second sheet and onward includes the ruled-line image and the inscription image corresponding to the inscription information inscribed onto the first sheet, and
  the inscription information inscribed on the first sheet is transferred onto the second sheet and onward;
  extract the inscription image from the first image, the extracted inscription image being a first intermediate image;
  extract the ruled-line image from the first image, the extracted ruled-line image being a second intermediate image;

position the first intermediate image with respect to the second intermediate image;

generate a second image in which a surplus image is removed from the generated first image, and the first intermediate image is positioned with respect to the second intermediate image, the second image being generated to include the first intermediate image and the second intermediate image, in accordance with a learning model that has learned to remove the surplus image different from the ruled-line image and the inscription image, wherein as a result of the inscription information being transferred from the first sheet to the second sheet and onward, the same inscription information exists in every one of the stacked plurality of sheets, and the surplus image does not exist on the uppermost sheet of the stacked plurality of sheets but exists on the second sheet and onward located below the uppermost sheet.

2. The image processing apparatus according to claim 1, wherein the learning model is a model that has learned to generate an original image from an input image including the surplus image in accordance with a combination of the input image and the original image not including the surplus image corresponding to the input image.

3. The image processing apparatus according to claim 1, wherein the learning model is a model generated as a result of performing learning using a generative adversarial network.

4. The image processing apparatus according to claim 2, wherein the learning model is a model generated as a result of performing learning using a generative adversarial network.

5. The image processing apparatus according to claim 1, wherein the processor is configured to:

perform control to output, as the inscription information, information indicating a recognition result obtained as a result of recognizing the generated second image.

6. The image processing apparatus according to claim 2, wherein the processor is configured to:

perform control to output, as the inscription information, information indicating a recognition result obtained as a result of recognizing the generated second image.

7. The image processing apparatus according to claim 3, wherein the processor is configured to:

perform control to output, as the inscription information, information indicating a recognition result obtained as a result of recognizing the generated second image.

8. The image processing apparatus according to claim 4, wherein the processor is configured to:

perform control to output, as the inscription information, information indicating a recognition result obtained as a result of recognizing the generated second image.

9. The image processing apparatus according to claim 5, wherein the processor is configured to:

perform control to adjust, a position of the second image based on ruled-line positional information indicating a predetermined position on a sheet of the ruled-line image such that a position of the ruled-line image in the second image matches a position according to the ruled-line positional information.

10. The image processing apparatus according to claim 6, wherein the processor is configured to:

perform control to adjust, a position of the second image based on ruled-line positional information indicating a predetermined position on a sheet of the ruled-line image such that a position of the ruled-line image in the second image matches a position according to the ruled-line positional information.

11. The image processing apparatus according to claim 7, wherein the processor is configured to:

perform control to adjust, a position of the second image based on ruled-line positional information indicating a predetermined position on a sheet of the ruled-line image such that a position of the ruled-line image in the second image matches a position according to the ruled-line positional information.

12. The image processing apparatus according to claim 8, wherein the processor is configured to:

perform control to adjust, a position of the second image based on ruled-line positional information indicating a predetermined position on a sheet of the ruled-line image such that a position of the ruled-line image in the second image matches a position according to the ruled-line positional information.

13. The image processing apparatus according to claim 9, wherein attribute information about a ruled-line frame indicating an inscription article to be inscribed in a region formed by the ruled-line frame of the ruled-line image is set in advance, and the processor is configured to perform control to recognize the second image with respect to the region formed by the ruled-line frame and output a recognition result of the region and the attribute information about the ruled-line frame in correspondence with each other.

14. The image processing apparatus according to claim 10, wherein attribute information about a ruled-line frame indicating an inscription article to be inscribed in a region formed by the ruled-line frame of the ruled-line image is set in advance, and the processor is configured to perform control to recognize the second image with respect to the region formed by the ruled-line frame and output a recognition result of the region and the attribute information about the ruled-line frame in correspondence with each other.

15. The image processing apparatus according to claim 11, wherein attribute information about a ruled-line frame indicating an inscription article to be inscribed in a region formed by the ruled-line frame of the ruled-line image is set in advance, and the processor is configured to perform control to recognize the second image with respect to the region formed by the ruled-line frame and output a recognition result of the region and the attribute information about the ruled-line frame in correspondence with each other.

16. The image processing apparatus according to claim 12, wherein attribute information about a ruled-line frame indicating an inscription article to be inscribed in a region formed by the ruled-line frame of the ruled-line image is set in advance, and the processor is configured to perform control to recognize the second image with respect to the region formed by the ruled-line frame and output a recognition result of the region and the attribute information about the ruled-line frame in correspondence with each other.

17. The image processing apparatus according to claim 1, wherein the inscription image is a written-text image.

18. The image processing apparatus according to claim 1, wherein the sheet group includes a sheet coated on one side with carbon.

19. The image processing apparatus according to claim 1, wherein the surplus image is an imprint image corresponding to imprint information about at least one of a scratch mark and an abrasion mark.

20. A non-transitory computer readable medium storing a program causing a computer to execute a process, the process comprising:

generating a first image, including a predetermined ruled-line image and an inscription image, from a second sheet in a sheet group, the sheet group being obtained by stacking a plurality of sheets including a first sheet and the second sheet, wherein the first sheet is an uppermost sheet of the plurality of sheets and inscription information is inscribed onto the first sheet by a user, the second sheet and onward includes the ruled-line image and the inscription image corresponding to the inscription information inscribed onto the first sheet, and the inscription information inscribed on the first sheet is transferred onto the second sheet and onward; transferred thereon and including the ruled-line image; and extracting the inscription image from the first image, the extracted inscription image being a first intermediate image;

extracting the ruled-line image from the first image, the extracted ruled-line image being a second intermediate image;

positioning the first intermediate image with respect to the second intermediate image;

generating a second image in which a surplus image is removed from the generated first image, and the first intermediate image is positioned with respect to the second intermediate image, the second image being generated to include the first intermediate image and the second intermediate image, in accordance with a learning model that has learned to remove the surplus image different from the ruled-line image and the inscription image, wherein as a result of the inscription information being transferred from the first sheet to the second sheet and onward, the same inscription information exists in every one of the stacked plurality of sheets, and the surplus image does not exist on the uppermost sheet of the stacked plurality of sheets but exists on the second sheet and onward located below the uppermost sheet.

* * * * *